US007288720B1

(12) United States Patent
Moyher et al.

(10) Patent No.: US 7,288,720 B1

(45) Date of Patent: Oct. 30, 2007

(54) GROUNDING DEVICE FOR BUNDLED CABLES

(75) Inventors: Kevin Moyher, Clinton, CT (US); Raymond Allard, Wallingford, CT (US); Paul Merola, Wallingford, CT (US); Tao Duan, Beijing (CN); Jun Zhang, Beijing (CN); Xin Fu, Beijing (CN); Wei Wang, Beijing (CN); Tai Qui, Beijing (CN); Jason Zhu, Shanghai (CN); Yunchuan Zhu, Shanghai (CN)

(73) Assignee: Times Microwave Systems, Inc., Wallingford, CT (US)

( * ) Notice: Subject to any disclaimer, the term of this patent is extended or adjusted under 35 U.S.C. 154(b) by 0 days.

(21) Appl. No.: 11/523,108

(22) Filed: Sep. 19, 2006

(51) Int. Cl.
*H02G 15/08* (2006.01)

(52) U.S. Cl. ...................................... 174/78; 174/88 C

(58) Field of Classification Search .............. 174/75 C, 174/78, 88 C; 439/579
See application file for complete search history.

(56) References Cited

U.S. PATENT DOCUMENTS

| | | | | |
|---|---|---|---|---|
| 1,089,642 | A | 3/1914 | Honold | |
| 3,777,050 | A | 12/1973 | Silva | |
| 4,117,259 | A | 9/1978 | Giebel et al. | |
| 5,527,994 | A | 6/1996 | Kasper | |
| 5,758,004 | A | 5/1998 | Alarcon et al. | |
| 6,160,217 | A | 12/2000 | Auclair | |
| 6,239,379 | B1 | 5/2001 | Cotter et al. | |
| 6,248,953 | B1 | 6/2001 | Miller | |
| 6,491,545 | B1 * | 12/2002 | Spiegel et al. | 439/579 |
| 6,639,152 | B2 | 10/2003 | Glew et al. | |
| 6,953,897 | B2 * | 10/2005 | Marroquin et al. | 174/75 C |
| 2005/0263316 | A1 | 12/2005 | Matsumo | |
| 2006/0234556 | A1 * | 10/2006 | Wu | 439/608 |

* cited by examiner

*Primary Examiner*—Chau N. Nguyen
(74) *Attorney, Agent, or Firm*—McCormick, Paulding & Huber LLP

(57) ABSTRACT

A device for electrically grounding bundled cables includes a first half component having an outer surface portion and an abutting surface portion, and a second half component having an outer surface portion and an abutting surface portion. The outer surface portion of the first half component and the outer surface portion of the second half component each define at least one groove longitudinally extending therealong for accommodating one of a plurality of cables held closely together in a bundled configuration. The abutting surface portion of the first half component and the abutting surface portion of the second half component are configured for engaging and cooperating with one another to form a grounding structure.

16 Claims, 1 Drawing Sheet

GROUNDING DEVICE FOR BUNDLED CABLES

FIELD OF THE INVENTION

This invention relates generally to electrical grounding equipment, and more particularly to a device for electrically grounding cables held closely together in a bundled configuration.

BACKGROUND OF THE INVENTION

Individual cables in a bundled configuration must be grounded mid-span in certain applications. Such applications include, for example, a bundled cable employed in an antenna system. In order to ground a bundled cable configuration mid-span between the ends of the bundled cable, the outer jacket of the bundled configuration must be stripped a predetermined length for access to the individual cables. The outer jackets of each of the individual cables must then be stripped in order to expose the outer conductors of the cables for contact with a grounding structure. The exposed conductors of the individual cables must then each be grounded. Because each of the individual cables are independent of and can have limited movement relative to each other, it is difficult to ensure that all of the individual cables are simultaneously maintained in contact with a grounding structure.

It is therefore an object of the present invention a grounding device which overcomes the drawbacks and disadvantages associated with prior mid-span grounding structures for a bundled cable configuration.

SUMMARY OF THE INVENTION

In an aspect of the present invention, a device for electrically grounding bundled cables includes a first half component having an outer surface portion and an abutting surface portion, and a second half component having an outer surface portion and an abutting surface portion. The outer surface portion of the first half component and the outer surface portion of the second half component each define at least one groove longitudinally extending therealong for accommodating one of a plurality of cables held closely together in a bundled configuration. The abutting surface portion of the first half component and the abutting surface portion of the second half component are configured for engaging one another such that the first half component and the second half component cooperate to form a grounding structure.

DETAILED DESCRIPTION OF THE PREFERRED EMBODIMENT

Figure 1:
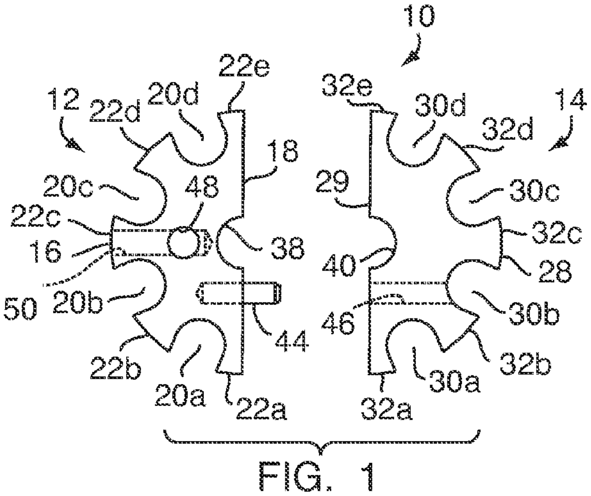
FIG. 1 is an end view of a disassembled grounding device embodying the present invention.
Figure 2:
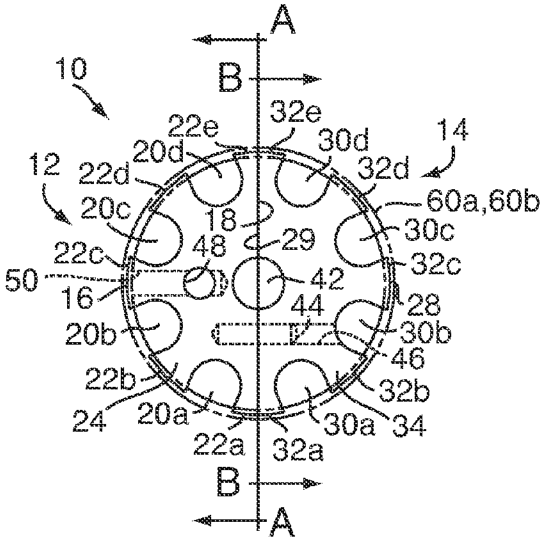
FIG. 2 is an end view of the grounding device of FIG. 1 in an assembled state.

With reference to FIGS. 1-5, a device for electrically grounding individual cables forming a bundled cable is generally designated by the reference number 10. The device 10 is generally cylindrical in shape and comprises a first half component 12 and a second half component 14 made of an electrically conductive material.

The first half component 12 is preferably generally semi-cylindrical in shape and has a generally semi-cylindrical outer surface portion 16 and a generally flat or planar abutting surface portion 18. The outer surface portion 16 defines a plurality of grooves 20 for receiving individual cables of a bundled cable. The grooves 20 are generally evenly spaced from one another by lands 22 and longitudinally extend from a first longitudinal end 24 to a second longitudinal end 26 of the first half component 12. Portions of the outer surface 16 which do not define the grooves 20 form the lands 22 such that each of the lands separates adjacent grooves.

More specifically and as shown in the figures, the first half component 12 defines four grooves 20*a,* 20*b,* 20*c,* 20*d* and five lands 22*a,* 22*b,* 22*c,* 22*d,* 22*e.* The groove 20*a* is disposed between the lands 22*a,* 22*b.* The groove 20*b* is disposed between the lands 22*b,* 22*c.* The groove 20*c* is disposed between the lands 22*c,* 22*d.* The groove 20*d* is disposed between the lands 22*d,* 22*e.* Although four grooves 20 are shown, the first half component 12 can define a fewer or a greater number of grooves. Moreover, the grooves 20 each are generally U-shaped in cross-section, but can take other practical shapes for receiving individual cables without departing from the scope of the present invention.

Likewise, the second half component 14 is preferably generally semi-cylindrical in shape and has a generally semi-cylindrical outer surface portion 28 and a generally flat or planar abutting surface portion 29. The outer surface portion 28 defines a plurality of grooves 30 for receiving individual cables of a bundled cable. The grooves 30 are generally evenly spaced from one another by lands 32 and longitudinally extend from a first longitudinal end 34 to a second longitudinal end 36 of the second half component 14. Portions of the outer surface 28 which do not define the grooves 30 form the lands 32 such that each of the lands separates adjacent grooves.

More specifically and as shown in the figures, the second half component 14 defines four grooves 30*a,* 30*b,* 30*c,* 30*d* and five lands 32*a,* 32*b,* 32*c,* 32*d,* 32*e.* The groove 30*a* is disposed between the lands 32*a,* 32*b.* The groove 30*b* is disposed between the lands 32*b,* 32*c.* The groove 30*c* is disposed between the lands 32*c,* 32*d.* The groove 30*d* is disposed between the lands 32*d,* 32*e.* Although four grooves 30 are shown, the second half component 14 can define a fewer or a greater number of grooves. Moreover, the grooves 30 each are generally U-shaped in cross-section, but can take other practical shapes for receiving individual cables without departing from the scope of the present invention.

The abutting surface portion 18 of the first half component 12 defines a first channel 38 longitudinally extending from the first longitudinal end 24 to the second longitudinal end 26 of the first half component. Similarly, the abutting surface portion 29 of the second half component 14 defines a second channel 40 longitudinally extending from the first longitudinal end 34 to the second longitudinal end 36 of the second half component. When the abutting surface portion 18 of the first half component 12 is in contact with the abutting surface portion 29 of the second half component 14, the first and second channels 38, 40 are longitudinally aligned and cooperate with one another to define a central bore 42 for receiving a central cable of a bundled cable.

Moreover, the abutting surface portion 18 of the first half component 12 defines a projection 44 extending outwardly from the abutting surface portion 18. The abutting surface portion 29 of the second half component 14 defines a hole 46 extending inwardly from the abutting surface portion 29. When the abutting surface portion 18 of the first half component 12 is in contact with the abutting surface portion 29 of the second half component 14, the projection 44 of the first half component 12 is received into the hole 46 of the second half component 14 in order to longitudinally align and loosely secure the first and second half components together.

The first half component 12 further defines a bore 48 extending from the first longitudinal end 24 to the second longitudinal end 26 of the first half component for receiving a grounding wire. The first half component 12 preferably also defines at least one threaded hole extending from one of the lands 22 to the bore 48 for receiving a screw to press against and thereby hold in place a grounding wire received in the bore. Three threaded holes 50 extend from the land 22 to the bore 48. Although the first half component 12 defines three threaded holes 50, the first half component can define a greater or fewer number of threaded holes without departing from the scope of the present invention.

Figure 3:
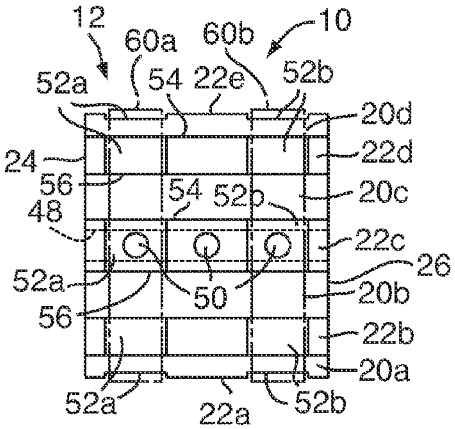
FIG. 3 is a side view of grounding device of FIG. 1.
Figure 4:
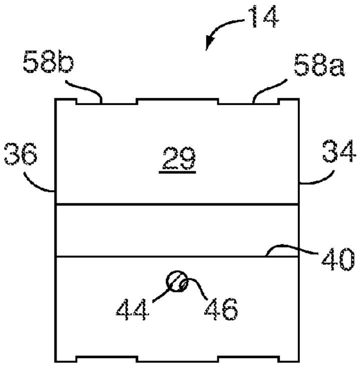
FIG. 4 is a side view of a component of the grounding device taken along the lines B-B of FIG. 2.
Figure 5:
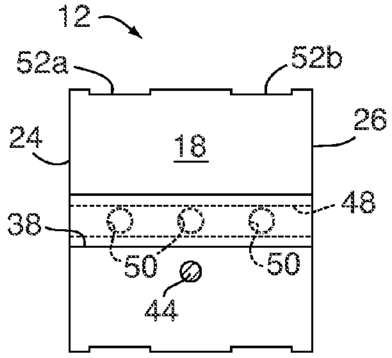
FIG. 5 is a side view of another component of the grounding device taken along the lines A-A of FIG. 2.

The lands 22 of the first half component 12 each preferably define a slot 52 circumferentially extending therealong from a first side 54 to a second side 56. As shown in FIG. 3, each of the lands 22 defines a first slot 52*a* circumferentially extending therealong adjacent to the first longitudinal end 24, and a second slot 52*b* circumferentially extending therealong adjacent to the second longitudinal end 26.

Similarly, the lands 32 of the second half component 14 each preferably define a slot 58 circumferentially extending therealong. Each of the lands 32 defines a first slot 58*a* circumferentially extending therealong adjacent to the first longitudinal end 34, and a second slot 58*b* circumferentially extending therealong adjacent to the second longitudinal end 36.

When the first half component 12 is engaged with the second half component 14, the first slots 52*a* of the first half component 12 are circumferentially aligned with the first slots 58*a* of the second half component 14. The aligned first slots 52*a*, 58*a* permit an elongated binding member 60*a* such as, but not limited to, a strap, tie wrap or the like to be received therein for securing together the first and second half components 12, 14, and for spanning over the grooves 20, 30 and thereby securing therein cables disposed in the grooves. Similarly, the second slots 52*b* of the first half component 12 are circumferentially aligned with the second slots 58*b* of the second half component 14. The aligned second slots 52*b*, 58*b* permit another elongated binding member 60*b* to be received therein for securing together the first and second half components 12, 14, and for spanning over the grooves 20, 30.

In operation, an outer jacket of a bundled cable (not shown) is partially stripped between its ends in order to access individual cables therein to be grounded. The outer jackets of the individual cables are each then partially stripped along a predetermined length thereof to expose the outer conductors of the cables for grounding contact with the device 10 which can accommodate nine individual cables. Four cables are respectively received in the grooves 20*a*, 20*b*, 20*c*, 20*d* of the first half component 12 such that the exposed outer conductors of the cables are in contact with the outer surface portion 16 defining the grooves. Likewise, an additional four cables are respectively received in the grooves 30*a*, 30*b*, 30*c*, 30*d* of the second half component 14 such that the exposed outer conductors of the cables are in contact with the outer surface portion 28 defining the grooves. Finally, a ninth cable is placed within the central bore 42 formed from the first channel 38 of the first half component 12 and the second channel 40 of the second half component 14. The grooves 20, 30 and the central bore 42 are preferably sized to snugly and frictionally contact the outer conductors of the cables disposed therein.

A grounding wire is received in the bore 48. Screws are then threaded into the three threaded holes 50 such that the tips of the screws pass against and hold in place the grounding wire in the bore 48. An elongated binding member 60*a* such as a strap, tie wrap or the like is then received onto the first slots 52*a* of the first half component 12 and the first slots 58*a* of the second half component 14 for securing together the first and second half components and for spanning the grooves 20, 30 to secure therein cables disposed in the grooves. Likewise, another elongated binding member 60*b* is received onto the second slots 52*b* of the first half component 12 and the second slots 58*b* of the second half component 14 for securing together the first and second half components and for spanning the grooves 20, 30 to secure therein cables disposed in the grooves. As a result, the outer conductors are securely grounded by means of being electrically coupled to the grounding wire via the electrically conductive first and second half components 12, 14.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each being generally semi-cylindrical in shape and each defining at least one groove longitudinally extending therealong for accommodating one of a plurality of cables held closely together in a bundled configuration; and wherein the abutting surface portion of the first half component and the abutting surface portion of the second half component are configured for engaging one another such that the first half component and the second half component cooperate to form a grounding structure.

2. A device as defined in claim 1, wherein the abutting surface portion of the first half component and the abutting surface portion of the second half component are each generally planar in shape.

3. A device as defined in claim 1, wherein the outer surface portion of the first half component and the outer surface portion of the second half component each define four grooves generally evenly spaced from one another and longitudinally extending therealong each for accommodating one of a plurality of cables held closely together in a bundled configuration.

4. A device as defined in claim 1, wherein:

the abutting surface portion of one of the first half component and the second half component defines a projection extending outwardly therefrom; and the abutting surface portion of the other of the first half component and the second half component defines a hole extending inwardly therefrom, the projection being configured for being received into the hole in order to longitudinally align and loosely secure the first half component and the second half component together.

5. A device as defined in claim 1, wherein the outer surface portion of the first half component and the outer surface portion of the second half component each define lands separating adjacent grooves.

6. A device as defined in claim 1, wherein the at least one groove defined by the outer surface portion of the first half component and the at least one groove defined by the outer surface portion of the second half component are each generally U-shaped.

7. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration; and the abutting surface portion of the first half component and the abutting surface portion of the second half component being configured for engaging one another such that the first half component and the second half component cooperate to form a generally cylindrical grounding structure.

8. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure;

the abutting surface portion of the first half component defining a first channel longitudinally extending therealong;

the abutting surface portion of the second half component defining a second channel longitudinally extending therealong; and the abutting surface portion of the first half component and the abutting surface portion of the second half component being configured for engaging one another such that the first half component and the second half component cooperate to form a generally cylindrical grounding structure, and such that the first channel and the second channel cooperate to form a central bore longitudinally extending through the grounding structure for receiving one of a plurality of cables held closely together in a bundled configuration.

9. A device as defined in claim 8, wherein the central bore is generally circular.

10. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure; and one of the first half component and the second half component defining a bore longitudinally extending therethrough for receiving a grounding wire.

11. A device as defined in claim 10, wherein said one of the first half component and the second half component defines at least one threaded hole extending from the outer surface portion to the bore for receiving a threaded screw for retaining a grounding wire in the bore.

12. A device as defined in claim 10, wherein said one of the first half component and the second half component defines three threaded holes longitudinally spaced therealong each extending from the outer surface portion to the bore for receiving a threaded screw for retaining a grounding wire in the bore.

13. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure;

the outer surface portion of the first half component and the outer surface portion of the second half component each defining lands separating adjacent grooves; and the lands defined by the first half component and the lands defined by the second half component each defining slots circumferentially aligned with one another for receiving an elongated binding member to span over the grooves in order to secure therein cables when disposed within the grooves.

14. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure;

the outer surface portion of the first half component and the outer surface portion of the second half component each defining lands separating adjacent grooves; and the lands defined by the first half component and the lands defined by the second half component each defining a first set of slots adjacent to a first longitudinal end thereof circumferentially aligned with one another, and a second set of slots adjacent to a second longitudinal end thereof circumferentially aligned with one another, the first set of slots and the second set of slots each being configured for receiving an elongated binding member to span over the grooves in order to secure therein cables when disposed within the grooves.

15. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure; and one of the first half component and the second half component defining a generally circular bore longitudinally extending therethrough for receiving a grounding wire.

16. A device for electrically grounding bundled cables, comprising:

a first half component having an outer surface portion and an abutting surface portion;

a second half component having an outer surface portion and an abutting surface portion;

the outer surface portion of the first half component and the outer surface portion of the second half component each defining at least one groove longitudinally extending therealong for accommodating one of a plurality of cables held closely together in a bundled configuration;

the abutting surface portion of the first half component and the abutting surface portion of the second half component being configured for engaging one another such that the first half component and the second half component cooperate to form a grounding structure;

the outer surface portion of the first half component and the outer surface portion of the second half component each defining lands separating adjacent grooves; and the first half component and the second half component each having two of the lands adjacent to the abutting surface, and wherein each of the lands adjacent to the abutting surface of the first half component cooperates with an opposing land adjacent to the abutting surface of the second half component to form a single land when the first half component and the second half component engage one another.

* * * * *